Patented Sept. 25, 1934

1,974,877

UNITED STATES PATENT OFFICE 1,974,877

METHOD OF PREPARING PEAT FOR FERTILIZING PURPOSES

Richard Schubert, Bremen, Germany

No Drawing. Application January 26, 1932, Serial No. 589,049

3 Claims. (Cl. 71—9)

In order to enrich the soil with humus, it is usual to sprinkle the surface with peat dust. It has also been proposed to mix peat with organic or inorganic fertilizing salts in order to facilitate the uniform distribution of the latter and the better to preserve it during storage.

Fertilizers are also prepared by mixing powdered peat with solid fertilizers, and peat has also been employed as an absorbent of dissolved fertilizers and subsequently, after drying, as a fertilizing medium. Mixtures of peat and caustic and carbonic alkalies and phosphates have also been made in order to convert some of the soluble substances into soluble fertilizers.

The object of the present invention is to produce such an intimate mixture of peat dust and fertilizing salts as will not only provide the soil with the necessary enrichment with humus but will also ensure a uniform distribution in the soil of the fertilizing salt, and the invention consists in intimately mixing a small percentage of fertilizing salts, either dissolved or in the form of a powder, with air dried peat dust either during or after the grinding of the latter, and compressing the mixture so as to bind the materials effectively together.

The fertilizer thus obtained will at each application effect an appropriate renewal of all the substances used up in the growth of the plants. The colloid water present in the air dried peat enters, during the compression, into an intimate combination with the fertilizing salts and ensures a favourable distribution of the latter in the soil.

The invention may be carried out in different manners as shown by the following examples.

A small percentage, for instance 5–15% of fertilizing salt such as phosphate, potash, kainit, lime, ground guano or the like, is mixed in dry and powdered state with peat dust, either during or after the grinding of the latter or while it is being sifted. The peat dust must be air dried, i. e., it must have a water content of about 30–35%. Preferably the salts are added in repeated, small doses while the peat is being worked in a stirring machine. After the salts have been intimately mixed with the peat fibres in this manner, the resulting product is compressed and is placed in compressed condition on the market as a peat manure. Owing to the compression an intimate mixing of the colloid water with the salts will take place, and the peat fibres will be impregnated with the salts. When subsequently used as a manure, the product can be uniformly distributed over the ground in a comparatively thin layer and will have the effect of loosening the soil and enriching it with humus.

As a further example, the fertilizing salts may be mixed with the peat dust in a dissolved state. For this purpose 10 kgs. of salt are dissolved in about 5 litres of water. This solution is applied as a fine spray to the peat while the latter is being worked and stirred. An intimate combination of the salt solution with the colloid water of the peat is obtained in this manner. When the mixture is subsequently compressed, the solution penetrates the peat fibres and binds the materials together.

As a still further example, 20 kgs. air dried peat dust are mixed with 20 kgs. dry fertilizing salt in the form of a powder. The mixture may be effected while the peat dust is being sifted. The remaining 80 kgs. of peat dust is then added to the mixture, and the whole is stirred until the added peat fibres have been intimately mixed with the fibres containing the fertilizing salt. Finally the mixture is compressed.

As a still further example, 10 kgs. of fertilizing salt are converted with water into a viscous mass into which about 20 kgs. of peat dust are stirred to form a uniform and intimate mixture. Also in this case the salt solution will bind effectively with the peat fibres. To the mixture thus obtained about 80 kgs. of air dried peat dust are added, and the entire mass is carefully worked so as to produce an intimate mixture which is finally compressed.

I claim:

1. A method of preparing peat for fertilizing purposes, consisting in adding to air dried peat dust during its manufacture 10% powdered water soluble fertilizing salt, working the materials together to obtain a uniform and intimate mixture, and compressing the mixture so that the salt will be dissolved by the colloid water contained in the peat particles and impregnate the latter.

2. A method of preparing peat for fertilizing purposes, consisting in mixing equal parts by weight of powdered fertilizing salt and air dried peat dust, working twice the quantity of air dried peat dust into the mixture thus obtained, and compressing the final product.

3. A method of preparing peat for fertilizing purposes, consisting in converting one part by weight of a fertilizing salt with water into a viscous mass, working two parts of air dried peat dust into this mass until an intimate mixture is obtained, working eight parts of air dried peat dust into said mixture, and compressing the resulting product.

RICHARD SCHUBERT.